United States Patent
Park et al.

(10) Patent No.: US 9,758,705 B2
(45) Date of Patent: Sep. 12, 2017

(54) PRESSURE SENSITIVE ADHESIVE COMPOSITION

(71) Applicant: LG Chem, Ltd., Seoul (KR)

(72) Inventors: Yong Su Park, Daejeon (KR); Se Woo Yang, Daejeon (KR); Suk Ky Chang, Daejeon (KR); Min Soo Park, Daejeon (KR); Eun Suk Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/564,542

(22) PCT Filed: Jun. 18, 2014

(86) PCT No.: PCT/KR2014/005380
§ 371 (c)(1),
(2) Date: Dec. 9, 2014

(87) PCT Pub. No.: WO2014/204217
PCT Pub. Date: Dec. 24, 2014

(65) Prior Publication Data
US 2016/0264828 A1 Sep. 15, 2016

(30) Foreign Application Priority Data
Jun. 19, 2013 (KR) .................. 10-2013-0070634

(51) Int. Cl.
*B32B 7/12* (2006.01)
*C09J 133/06* (2006.01)
(Continued)

(52) U.S. Cl.
CPC .............. *C09J 133/06* (2013.01); *C09J 4/00* (2013.01); *C09J 7/0217* (2013.01);
(Continued)

(58) Field of Classification Search
None
See application file for complete search history.

(56) References Cited

U.S. PATENT DOCUMENTS 3,862,198 A * 1/1975 Kugele ................. C07F 7/2216
502/152
4,199,646 A * 4/1980 Hori .................... C08G 18/4063
428/344

(Continued)

FOREIGN PATENT DOCUMENTS

| EP | 2857472 A1 | 4/2015 |
| EP | 2993194 A1 | 3/2016 |

(Continued)

OTHER PUBLICATIONS

"Reference: Polymer Properties" from Polymer Products from Aldrich, Jul. 18, 2016.*

(Continued)

*Primary Examiner* — Anish Desai
(74) *Attorney, Agent, or Firm* — Lerner, David, Littenberg, Krumholz & Mentlik, LLP

(57) ABSTRACT

Provided are a pressure-sensitive adhesive composition, a pressure-sensitive adhesive optical laminate, a pressure-sensitive adhesive polarizing plate and a display device. The pressure-sensitive adhesive composition offers a pressure-sensitive adhesive that has excellent durability and processability in manufacturing due to increased hardness even when the pressure-sensitive adhesive layer is formed thinner than a typical adhesive composition, and that can prevent a pressure mark and leakage of the pressure-sensitive adhesive, as well as a bending problem generated when applied on an optical member such as a polarizing plate, etc.

17 Claims, 1 Drawing Sheet

(51) Int. Cl.
*C09J 4/00* (2006.01)
*C09J 175/04* (2006.01)
*G02B 1/04* (2006.01)
*C09J 7/02* (2006.01)
*G02F 1/1335* (2006.01)
*G02B 5/30* (2006.01)

(52) U.S. Cl.
CPC ......... *C09J 133/066* (2013.01); *C09J 175/04* (2013.01); *G02B 1/04* (2013.01); *G02F 1/133528* (2013.01); *C08G 2170/40* (2013.01); *C09J 2203/318* (2013.01); *C09J 2433/00* (2013.01); *G02B 5/3033* (2013.01); *G02F 2202/28* (2013.01)

(56) References Cited

U.S. PATENT DOCUMENTS

| | | | | |
|---|---|---|---|---|
| 5,552,451 | A * | 9/1996 | Everaerts | C08F 220/18 427/457 |
| 5,587,418 | A * | 12/1996 | Sasaki | C09D 151/06 428/201 |
| 7,285,313 | B2 | 10/2007 | Kim et al. | |
| 7,385,007 | B2 * | 6/2008 | Moroishi | C09J 133/02 525/192 |
| 2005/0197450 | A1 * | 9/2005 | Amano | C08K 5/0075 525/30 |
| 2006/0128925 | A1 | 6/2006 | Arai et al. | |
| 2009/0143497 | A1 * | 6/2009 | Choi | C09J 133/16 522/170 |
| 2009/0270557 | A1 * | 10/2009 | Tomita | C08G 18/6254 525/100 |
| 2009/0305068 | A1 | 12/2009 | Morishita et al. | |
| 2011/0033720 | A1 | 2/2011 | Fujita et al. | |
| 2011/0111140 | A1 * | 5/2011 | Jang | C09J 7/0217 428/1.33 |
| 2011/0143135 | A1 * | 6/2011 | Jeong | C09J 7/0217 428/355 AC |
| 2011/0206917 | A1 * | 8/2011 | Niimi | C08G 18/4063 428/216 |
| 2011/0236605 | A1 * | 9/2011 | Hattori | C08G 18/10 428/1.55 |
| 2012/0270042 | A1 * | 10/2012 | Hanai | C09J 7/0217 428/355 AC |
| 2012/0328890 | A1 | 12/2012 | Niimi et al. | |

FOREIGN PATENT DOCUMENTS

| | | |
|---|---|---|
| JP | 2005146151 A | 6/2005 |
| JP | 2007138056 A | 6/2007 |
| JP | 2012121949 A | 6/2012 |
| JP | 2012126757 A | 7/2012 |
| JP | 2013116935 A | 6/2013 |
| JP | 2013152963 A | 8/2013 |
| KR | 100594514 B1 | 6/2006 |
| KR | 100960731 B1 | 5/2010 |
| KR | 101023839 B1 | 3/2011 |
| KR | 101171976 B1 | 8/2012 |
| KR | 101171977 B1 | 8/2012 |
| TW | 201301222 A | 1/2013 |

OTHER PUBLICATIONS

Office Action from corresponding Taiwan Application No. 103121228, dated May 27, 2015.
International Search Report and Written Opinion for Application No. PCT/KR2014/005380 dated Sep. 25, 2014.
Extended Search Report from European Application No. 14814577.4, dated Jul. 6, 2016.

\* cited by examiner

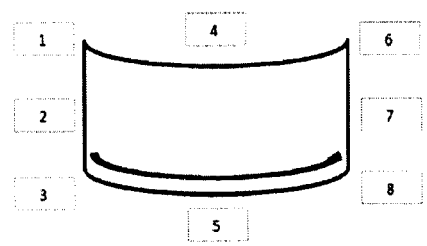

PRESSURE SENSITIVE ADHESIVE COMPOSITION

CROSS-REFERENCE TO RELATED APPLICATION

The present application is a continuation of International Application No. PCT/KR2014/005380, filed on Jun. 18, 2014, which claims priority from Korean Patent Application No. 10-2013-0070634, filed on Jun. 19, 2013, in the Korean Intellectual Property Office, the disclosures thereof are incorporated herein by reference.

BACKGROUND

1. Field of the Invention

The present invention relates to a pressure-sensitive adhesive composition, a pressure-sensitive adhesive optical laminate, a pressure-sensitive adhesive polarizing plate and a display device.

2. Discussion of Related Art

A liquid crystal display device (hereinafter referred to as "LCD device") generally includes a liquid crystal panel which has a liquid crystal composition injected between two transparent substrates, and an optical film. As the optical film, a polarizer film, a phase retardation film, a brightness enhancement film or the like is used.

To stack the optical films or attach the optical films to an adherend such as a liquid crystal panel, a pressure-sensitive adhesive for the optical film is often used. As the pressure-sensitive adhesive, those containing acrylic polymer, rubber, urethane resin, silicone resin, ethylene vinyl acetate (EVA) resin and so forth may be utilized.

In the pressure-sensitive adhesive for the optical film, physical properties such as transparency, durability, adhesion strength to the interface of the polarizing plate and so forth are required.

In Korean Patent Registration Nos. 1023839, 1171976, and 1171977, pressure-sensitive adhesive compositions used in optical films are proposed.

SUMMARY OF THE INVENTION

The present invention is directed to a pressure-sensitive adhesive composition, a pressure-sensitive adhesive optical laminate, a pressure-sensitive adhesive polarizing plate and a display device.

According to an exemplary embodiment of the present invention, a pressure-sensitive adhesive composition may include a pressure-sensitive adhesive polymer.

In an exemplary embodiment of the present invention, the term "pressure-sensitive adhesive polymer" may denote a polymer which is prepared by mixing and polymerizing one or more different types of monomers and which has a pressure-sensitive adhesive property.

In an exemplary embodiment of the present invention, the pressure-sensitive adhesive polymer may include a polymerization unit of a first monomer which forms a homopolymer having a glass transition temperature of less than 0° C., and a polymerization unit of a second monomer which forms a homopolymer having a glass transition temperature of 0° C. or more.

The term "monomer which forms a homopolymer having a glass transition temperature of less than 0° C. or 0° C. or more" used herein, may denote that the glass transition temperature measured or calculated from a homopolymer which is only constructed from identical monomers is less than 0° C. or 0° C. or more. Further, in the present specification, a polymer containing a monomer as a polymerization unit may also mean that the monomer forms the frame of the polymer, such as main chains or side chains, through polymerization.

The glass transition temperature of the first monomer may be, for example, less than 0° C., less than −5° C., less than −10° C., less than −15° C. or less than −20° C. The lower limit of the glass transition temperature of the first monomer is not particularly limited and may be, for example, −150° C., −125° C., or −100° C. The glass transition temperature of the first monomer may properly range from 100° C. to −20° C., from −80° C. to −25° C. or from −60° C. to −30° C.

As the first monomer, an alkyl (meth)acrylate containing an alkyl group with 1 to 20 carbon atoms, 1 to 16 carbon atoms, 1 to 12 carbon atoms, 1 to 8 carbon atoms, or 1 to 4 carbon atoms may be used in consideration of control of the glass transition temperature. In the above, the alkyl group may be a branched-chain or straight-chain alkyl group. The first monomer may include n-butyl acrylate, isobutyl acrylate, n-propyl acrylate, pentyl acrylate, n-hexyl acrylate, n-heptyl acrylate, n-octyl acrylate, n-nonyl acrylate or the like, and one or more types may be selected therefrom and used so as to secure the above-mentioned glass transition temperature.

The glass transition temperature of the second monomer may be, for example, 0° C. or more or 5° C. or more. The upper limit of the glass transition temperature of the second monomer is not particularly limited and may be, for example, 300° C., 250° C. or 200° C. The glass transition temperature of the second monomer may properly range from 5° C. to 200° C., from 5° C. to 160° C. or from 5° C. to 120° C.

The second monomer may include, but is not limited to, an acyclic monomer in consideration of the range of the glass transition temperature.

The term "acyclic monomer" used herein may refer to a monomer that does not include an alicyclic compound or a compound containing a benzene ring in its molecule.

As the acyclic monomer, for example, an alkyl acrylate or vinyl acetate containing a straight-chain or branched-chain alkyl group with 1 to 6 carbon atoms may be utilized.

As the alkyl acrylate used as the second monomer, for example, tertiarybutyl acrylate, isobutyl acrylate, sec-butyl acrylate, 2-methoxyethyl acrylate, methyl acrylate, n-propyl acrylate and so forth may be used, preferably, tertiarybutyl acrylate or methyl acrylate may be used, but it is not limited to these.

The pressure-sensitive adhesive composition containing the pressure-sensitive adhesive polymer which is composed of the second monomer and the first monomer having the glass transition temperatures within the ranges represented above, even when the pressure-sensitive adhesive is prepared as a thin layer, may exhibit excellent durability and increased hardness, and thus enhance, processability in manufacturing by addressing issues such as pitting, bending of the cell, and peeling of the pressure-sensitive adhesive.

The pressure-sensitive adhesive polymer may include a polymerization unit of a cross-linking monomer. The term "cross-linking monomer" used herein may refer to a polymerizable monomer containing a cross-linking functional group.

As the cross-linking monomer, for example, a monomer which may be polymerized with the monomer included in the pressure-sensitive adhesive polymer such as the alkyl (meth)acrylates mentioned above, and which also contains a cross-linking functional group, may be utilized. A variety of monomers containing a cross-linking functional group are known in the field of production of pressure-sensitive adhesives and any of such monomers may be utilized for the pressure-sensitive adhesive polymer.

According to an embodiment of the present invention, the cross-linking functional group may be a hydroxy group or a carboxyl group, and preferably, a hydroxy group.

The copolymerizable monomer having the hydroxy group may include, but is not limited to, a hydroxyalkyl (meth) acrylate such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate and the like, or a hydroxyalkyleneglycol (meth)acrylate such as 2-hydroxyethyleneglycol (meth)acrylate, 2-hydroxypropyleneglycol (meth)acrylate, etc. The copolymerizable monomer having the carboxyl group may include, but is not limited to, (meth)acrylic acid, 2-(meth)acryloyloxy acetic acid, 3-(meth)acryloyloxypropionate, 4-(meth) acryloyloxybutyrate, acrylic acid dimer, itaconic acid, maleic acid, maleic acid anhydride, etc. Among them, it is preferred to use 2-hydroxyethyl (meth)acrylate or 2-hydroxypropyl (meth)acrylate as the copolymerizable monomer, but it is not limited thereto.

According to an embodiment of the present invention, the pressure-sensitive adhesive polymer may contain 60 to 95 parts by weight of the polymerization unit of the first monomer, 1 to 40 parts by weight of the polymerization unit of the second monomer; and 0.1 to 10 parts by weight of the polymerization unit of the cross-linking monomer. The unit "parts by weight" used herein may refer to the weight ratio between the elements. According to another embodiment of the present invention, the pressure-sensitive adhesive polymer may contain 70 to 90 parts by weight of the polymerization unit of the first monomer; 10 to 30 parts by weight of the polymerization unit of the second monomer; and 0.5 to 5 parts by weight of the polymerization unit of the cross-linking monomer. When the pressure-sensitive adhesive polymer is controlled to include the first monomer, the second monomer, and the cross-linking monomer at the aforementioned weight ratio, the pressure-sensitive adhesive composition may exhibit excellent durability and enhance processability in manufacturing by preventing pitting, bending of the cell and a peeling of the pressure-sensitive adhesive, even when the pressure-sensitive adhesive is prepared as a thin layer.

Any other monomers acceptable for copolymerization may be additionally added to the pressure-sensitive adhesive polymer, if necessary, such as to regulate the glass transition temperature, and the aforementioned monomers may also be contained in the pressure-sensitive adhesive polymer as polymerization units. As a comonomer, a styrene-based monomer such as methyl styrene; or a monomer containing a glycidyl group such as glycidyl (meth)acrylate or the like may be used, but it is not limited thereto. According to necessity, one or more types may be selected properly among such comonomers and included in the pressure-sensitive adhesive polymer. For example, such comonomers may be included at the ratio of 20 parts by weight or less, or 0.1 to 15 parts by weight with respect to the weight of other monomers in the pressure-sensitive adhesive polymer.

According to an embodiment of the present invention, the pressure-sensitive adhesive polymer may have a weight average molecular weight ranging from 100,000 to 3,000,000, from 500,000 to 2,500,000, or from 1,000,000 to 2,000,000. An additive effect of the pressure-sensitive adhesive polymer having the weight average molecular weight within the above range may be increased, thus forming the pressure-sensitive adhesive composition with an excellent pressure-sensitive adhesive property and durability.

For example, the pressure-sensitive adhesive polymer may have a glass transition temperature ranging from −50° C. to 50° C., from −50° C. to 30° C., or from 50° C. to 10° C. in a state in which a cross-linked structure is formed. An additive effect of the pressure-sensitive adhesive polymer having the glass transition temperature within the above range may be improved and the pressure-sensitive adhesive composition may have an increased pressure-sensitive adhesion property and durability.

The acid value of the pressure-sensitive adhesive polymer may be 1.0 or less. The term "acid value" used herein may denote the number of milligrams of potassium hydroxide (KOH) which is required to neutralize the acidic constituents such as free fatty acids or resin acids in 1 g of a sample, and which is expressed in units of mgKOH/g. When the acid value of the pressure-sensitive adhesive polymer is 1.0 or less, although the lower limit of the acid value is not specifically limited, for example, it may fall within the range from 0.01 to 0.5. In the present specification, when the pressure-sensitive adhesive composition including the pressure-sensitive adhesive polymer which has the acid value within the range mentioned above is applied to the optical member coated with indium tin oxide (ITO), the reduced product life and the deterioration of the touch performance attributable to decomposition and corrosion of ITO may be avoided.

A polymerization method for the pressure-sensitive adhesive polymer is not specifically limited, for example, the pressure-sensitive adhesive polymer may be prepared by a conventional polymerization method such as solution polymerization, photo polymerization, bulk polymerization, suspension polymerization or emulsion polymerization.

According to an exemplary embodiment of the present invention, the pressure-sensitive adhesive composition may further include a catalyst, together with the pressure-sensitive adhesive polymer. The catalyst functions to increase the rate of a cross-linking reaction between the cross-linking agent and the monomer containing a functional group. As the catalyst, for example, an amine-based compound, an organometallic compound, a tin-based compound or a combination thereof may be used.

The amine-based compound may be, but is not limited to, at least one selected from the group consisting of trialkylaminoalkylethanol amines, N,N,N',N'-tetraalkylhexanediamines, trialkylamines and imidazole, and may be the organometallic compound including naphthenic acid cobalt or the tin-based compound. The tin-based compound may be, but is not limited to, at least one selected from the group consisting of dialkyltin diacetates, dialkyltin diacetylacetonates, tetra-n-dialkyltins, trialkyltin hydroxides and dialkyltin dilaurates. Preferably, the tin-based compound may be utilized as the catalyst, and in such a case, yellowing of the pressure-sensitive adhesive composition may be minimized. The "alkyl" may include an alkyl group having 1 to 20 carbon atoms, 1 to 16 carbon atoms, or 1 to 12 carbon atoms, but it is not specifically limited thereto.

The content of the catalyst in the pressure-sensitive adhesive composition in accordance with an exemplary embodiment of the present invention may be 1 to 40 ppm, 1 to 30 ppm, or 1 to 20 ppm with respect to the content of the pressure-sensitive adhesive polymer. By adjusting the content of the catalyst, air bubbles formed on the pressure-sensitive adhesive, physical damage and time loss attributable to a decreased curing rate may be prevented and problems such as peeling and degraded durability of the pressure-sensitive adhesive due to insufficient bonding strength to the surface attributable to an increased curing rate may be overcome.

The pressure-sensitive adhesive composition may further include a cross-linking agent enabling the pressure-sensitive adhesive polymer to form a cross-linked structure. As the cross-linking agent, the cross-linking agent containing at least 1 or more, 1 to 10, 1 to 8, 1 to 6 or 1 to 4 functional groups which may react with the cross-linking functional group in the pressure-sensitive adhesive polymer may be used. As such a cross-linking agent, an appropriate type of the cross-linking agent may be selected from typical cross-linking agents such as an isocyanate cross-linking agent, an epoxy cross-linking agent, an aziridine cross-linking agent, a metal chelate cross-linking agent or the like, in consideration of the types of the cross-linking functional group in the pressure-sensitive adhesive polymer.

The isocyanate cross-linking agent may include a diisocyanate compound such as tolylene diisocyanate, xylene diisocyanate, diphenylmethane diisocyanate, hexamethylene diisocyanate, isophorone diisocyanate, tetramethylxylene diisocyanate, naphthalene diisocyanate or reactants thereof with polyols such as trimethylolpropane, isocyanurate adducts thereof, etc., and more preferably, xylene diisocyanate or hexamethylene diisocyanate may be utilized for the isocyanate cross-linking agent. The epoxy cross-linking agent may include at least one selected from the group consisting of ethyleneglycol diglycidylether, triglycidylether, trimethylolpropane triglycidylether, N,N,N',N'-tetraglycidyl ethylenediamine and glycerin diglycidylether.

Further, the aziridine cross-linking agent may include, but is not limited to, N,N'-toluene-2,4-bis(1-aziridinecarboxamide), N,N'-diphenylmethane-4,4'-bis(1-aziridinecarboxamide), triethylene melamine, bisisoprothaloyl-1-(2-methyl-aziridine) or tri-1-aziridinylphosphineoxide, etc. The metal chelate cross-linking agent may be selected from the group consisting of compounds in which a polyvalent metal such as aluminum, iron, zinc, tin, titanium, antimony, magnesium and/or vanadium is coordinated with acetylacetone or acetoacetateethyl, but the metal chelate cross-linking agent is not limited thereto.

100 parts by weight of the pressure-sensitive adhesive polymer may contain, for example, 0.01 to 10 parts by weight, 0.02 to 5 parts by weight, 0.03 to 3 parts by weight or 0.05 to 1 parts by weight of the cross-linking agent. By adjusting the content of the cross-linking agent in the above-mentioned range and applying it to the pressure-sensitive adhesive polymer, the pressure-sensitive adhesive composition may have superior durability and workability by resolving the problems such as pitting, bending of the cell, and peeling of the pressure-sensitive adhesive.

The pressure-sensitive adhesive composition may still further include a silane coupling agent. As such a silane coupling agent, for example, a silane coupling agent containing a beta-cyano group or an acetoacetyl group may be utilized. Such a silane coupling agent, for example, allows the pressure-sensitive adhesive to have a superior bonding property and adhesive stability even when the pressure-sensitive adhesive is formed of a polymer with a low molecular weight.

The silane coupling agent containing a beta-cyano group or an acetoacetyl group may include, for example, the compound expressed by the following Formula 1 or 2.

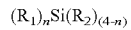 [Formula 1]

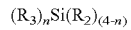 [Formula 2]

In Formula 1 or 2, $R_1$ is a beta-cyanoacetyl group or a beta-cyanoacetylalkyl group, $R_3$ is an acetoacetyl group or an acetoacetylalkyl group, $R_2$ is an alkoxy group and n is an integer of 1 to 3.

In Formula 1 or 2, the alkyl group may be the alkyl group having 1 to 20 carbon atoms, 1 to 16 carbon atoms, 1 to 12 carbon atoms, 1 to 8 carbon atoms or 1 to 4 carbon atoms, and the alkyl group may be a straight, branched or cyclic type.

In the Formula 1 or 2, n may be, for example, 1 to 3, 1 to 2 or 1.

As the compound represented by Formula 1 or 2, for example, acetoacetylpropyl trimethoxysilane, acetoacetylpropyl triethoxysilane, beta-cyanoacetylpropyl trimethoxysilane, beta-cyanoacetylpropyl triethoxysilane or the like may be used, but the compound is not limited thereto.

The pressure-sensitive adhesive composition may contain 0.01 to 5 parts by weight or 0.01 to 1 parts by weight of the silane coupling agent based on 100 parts by weight of the pressure-sensitive adhesive polymer. The pressure-sensitive adhesive composition prepared at the above ratio may allow a storage modulus and/or viscosity to be described below to be implemented effectively within the desired range.

The pressure-sensitive adhesive composition may, if necessary, further include a tackifier. For example, the tackifier may be, but is not limited to, one or more mixtures selected from hydrocarbon resins, or hydrogenated hydrocarbon resins, rosin resins, or hydrogenated rosin resins, rosin ester resins, or hydrogenated rosin ester resins, terpene resins, or hydrogenated terpene resins, terpene phenol resins, or hydrogenated terpene phenol resins, polymerized rosin resins or polymerized rosin ester resins, etc. The pressure-sensitive adhesive composition may contain 100 parts by weight or less of the tackifier based on 100 parts by weight of the pressure-sensitive adhesive polymer.

If necessary, the pressure-sensitive adhesive composition may further include one or more additives selected from the group consisting of a curing agent, a UV light stabilizer, an antioxidant, a coloring agent, a reinforcing agent, a filler, an antifoaming agent, a surfactant and a plasticizer.

The pressure-sensitive adhesive composition may have a gel fraction of 80 wt % or less after forming a cross-linked structure. The gel fraction may be calculated using the following Equation 1.

$$\text{Gel fraction (\%)} = B/A \times 100 \qquad [\text{Equation 1}]$$

In Equation 1, A is a mass of the pressure-sensitive adhesive composition forming a cross-linked structure, B is a dry mass of the insoluble fraction which is obtained by depositing the pressure-sensitive adhesive composition having a mass of A in ethyl acetate for 24 hours, in the state in which the pressure-sensitive adhesive composition is laid in the mesh having a size of 200 meshes at room temperature.

The pressure-sensitive adhesive maintaining a gel fraction of 80 wt % or less may provide improved workability and re-workability, and effectively implement an appropriate storage modulus and/or viscosity, which will be described below, at the desired range or more. The minimum gel fraction may be, but is not limited to, 0 wt %. However, a gel fraction of 0 wt % may not mean that no cross-linked structure has been formed in the pressure-sensitive adhesive composition. For instance, the pressure-sensitive adhesive composition having a gel fraction of 0 wt % may include a pressure-sensitive adhesive composition in which no cross-linking has occurred, or a pressure-sensitive adhesive composition in which so little cross-linking has occurred that gel leaks from the mesh with a size of 200 meshes during measurement of an acid value of the pressure-sensitive adhesive composition.

The gel fraction may be formed in the range from 70 to 80 wt %, but is not limited thereto, such that peeling and deteriorated durability due to the reduced cohesive force of a bulk within the pressure-sensitive adhesive having a gel fraction in the above range may be prevented, and a decrease in adhesive force and durability attributable to an excessive curing may also be suppressed.

According to an exemplary embodiment of the present invention, the pressure-sensitive adhesive composition may have a storage modulus measured at 30° C. and 1 rad/sec after curing ranging from 0.01 to 0.5 MPa, 0.02 to 0.25 MPa or 0.03 to 0.1 MPa. The term "storage modulus" used herein refers to a storage modulus which is measured in the state in which the pressure-sensitive adhesive composition is cured, that is, the pressure-sensitive adhesive is produced. In the present specification, there is no particular limitation on the method of measuring a storage modulus, and for example, the method represented in the following Examples may be adopted.

By adjusting the storage modulus of the pressure-sensitive adhesive composition, which is measured after curing, the pressure-sensitive adhesive may exhibit superior physical properties such as durability and removability, and may provide for uniformity in light transmission, even when applied to a large-area display device.

The present invention is also directed to a pressure-sensitive adhesive optical laminate. According to an embodiment of the present invention, the pressure-sensitive adhesive optical laminate may include an optical film; and a pressure-sensitive adhesive layer formed on either or both sides of the optical film. The pressure-sensitive adhesive layer may serve to attach the optical film to a liquid crystal panel or another optical film in an LCD device. In addition, the pressure-sensitive adhesive layer may include the aforementioned pressure-sensitive adhesive composition according to an exemplary embodiment of the present invention. The pressure-sensitive adhesive composition may be contained in the pressure-sensitive adhesive layer, forming a cross-linked structure. The optical film may include a polarizer film, a retardation film, a brightness enhancement film or a laminate formed of two or more of the above-mentioned films.

The present invention is also directed to a pressure-sensitive adhesive polarizing plate. The polarizing plate may have a structure, for example, in which a polarizer film is used as an optical film in the pressure-sensitive adhesive optical laminate.

The type of the polarizer film used in the polarizing plate is not specifically limited and a polarizer film typically known in the field, such as polyvinyl alcohol-based polarizer film, may be utilized.

A polarizer film is a functional optical film that may extract only light propagating in one direction from incident light while oscillating in various directions. Such a polarizer film may be, for example, in the form of a polyvinyl alcohol-based resin film on which a dichroic dye is absorbed and oriented. The polyvinyl alcohol-based resin constituting the polarizer film may be obtained by a gelation of a polyvinyl acetate-based resin. In such a case, the applicable polyvinyl acetate-based resin may also include a homopolymer formed of vinyl acetate, or a copolymer formed of other monomers copolymerizable with vinyl acetate and the homopolymer formed of vinyl acetate. The monomers copolymerizable with vinyl acetate may include one or more mixtures selected from unsaturated carboxylic acid, olefin, vinyl ether, unsaturated sulfonic acid, acrylamide having an ammonium group, etc., but they are not limited these. The degree of gelation of the polyvinyl acetate-based resin typically ranges from 85 mol % to 100 mol %, and is preferably 98 mol % or more. The polyvinyl alcohol-based resin may be additionally modified, for example, polyvinyl formal or polyvinyl acetal modified to a type of aldehyde may also be used. Further, the degree of polymerization of the polyvinyl alcohol-based resin typically ranges from 1,000 to 10,000, or from 1,500 to 5,000.

The polarizer film may be prepared via stretching (e.g., uniaxially stretching) the polyvinyl alcohol-based resin film, dyeing the polyvinyl alcohol-based resin film with dichroic dyes and absorbing such dichroic dyes thereon, treating the dichroic dye-absorbed polyvinyl alcohol-based resin film with a boric acid solution, and then cleaning the treated film. As the dichroic dye, iodine or a dichroic organic dye or the like may be used.

The polarizing plate may also further include the protecting film adhered to either or both sides of the polarizer film, and in such a case, the pressure-sensitive adhesive layer may be formed on one side of the protecting film. The type of the protecting film is not specifically limited, and a film prepared by laminating one or more layers of cellulose-based films such as triacetyl cellulose (TAC); a polycarbonate film or polyester-based film such as polyethylene terephthalate (PET); a polyethersulfone-based film; a polyolefin-based film prepared using a polyethylene film, a polypropylene film, a resin with a cyclic or norbornene structure or an ethylene propylene copolymer, etc. may be utilized.

The polarizing plate also additionally includes one or more functional layers selected from the group consisting of a protecting layer, a reflective layer, an anti-glare layer, a retardation layer, a wide-viewing angle compensation film and a brightness enhancement film.

In the present specification, the method of forming a pressure-sensitive adhesive layer on a polarizing film or on an optical film is not specifically limited. For example, the pressure-sensitive adhesive composition may be applied directly on a polarizing plate or on an optical film and cured so as to form a cross-linked structure. Further, the pressure-sensitive adhesive composition may also be applied and dried on a release-processed surface of the release film, producing a cross-linked structure, and then the prepared pressure-sensitive adhesive layer on the release film may be transferred onto a polarizing plate or onto an optical film.

The method of coating a pressure-sensitive adhesive composition is not particularly limited, and for example, the pressure-sensitive adhesive composition may be applied on a polarizing plate or on an optical film by a conventional method such as using a bar coater.

To obtain an even coating, it is preferred that a polyfunctional cross-linking agent in the pressure-sensitive adhesive composition be controlled not to generate a cross-linking reaction during the coating process. In the drying and aging process following the coating, the cross-linking agent may generate a cross-linked structure so as to increase cohesive force, a pressure-sensitive adhesive property and cuttability of the pressure-sensitive adhesive.

In the coating process, it is also preferred to eliminate volatile components and reaction residues within the pressure-sensitive adhesive composition so as not to generate bubbles. Thereby, a low cross-linking density or a reduced molecular weight of the pressure-sensitive adhesive causing a low modulus of elasticity is prevented, and bubbles generated between a glass substrate and an adhesive layer may be prevented from growing at a high temperature and forming a scatterer inside the pressure-sensitive adhesive layer.

The method of producing a cross-linked structure by curing the pressure-sensitive adhesive composition, following the coating, is not particularly limited either. For example, the coating layer may be maintained at the optimal temperature to induce a cross-linking reaction of a block copolymer and a polyfunctional cross-linking agent within the coating layer.

The present invention is also directed to a display device, such as an LCD device. According to an exemplary embodiment of the present invention, a display device may include a liquid crystal panel, a polarizing plate or an optical laminate attached to either or both sides of the liquid crystal panel. The polarizing plate or the optical laminate may be adhered to the liquid crystal panel using the afore-described pressure-sensitive adhesive.

As the liquid crystal panel in the above device, any panel known in the field such as a passive matrix type panel, such as a twisted-nematic (TN) type, a super twisted-nematic (STN) type, a ferroelectric (F) type, or a polymer-dispersed (PD) type; an active matrix type panel such as a two-terminal type or a three-terminal type; an in-plane switching (IPS) panel, a vertical alignment (VA) panel, or the like may all be applicable for the liquid crystal panel.

Further, other components of the LCD device, such as an upper or lower color filter substrate or array substrate, are not specifically limited in type and components known in the field may be used without limitation.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a schematic view illustrating a bending evaluation method of polarizing plates to which the pressure-sensitive adhesive prepared according to Examples and Comparative Examples of the present invention is applied; and FIG. 2 is a picture illustrating peeling of the pressure-sensitive adhesive on the polarizing plates prepared according to Example 1, Comparative Example 1 and Comparative Example 4 of the present invention.

DETAILED DESCRIPTION OF EXEMPLARY EMBODIMENTS

Exemplary embodiments of the pressure-sensitive adhesive composition of the present invention will be described in detail below with reference to the following Examples and Comparative Examples. However, it will be apparent to those skilled in the art that the scope of the pressure-sensitive adhesive composition is not limited by the following Examples and Comparative Examples.

1. Evaluation of Pressure-Sensitive Adhesive Peeling

The polarizing plate prepared in Examples or Comparative Examples was aged for 3 days after being produced, and the release film thereon was removed, such that a pressure-sensitive adhesive layer was exposed. A powerful adhesive tape with a thickness of 50 mm (consumable adhesive masking tape, manufactured by TAPEX) was attached to the pressure-sensitive adhesive layer and stripped therefrom, and then the residue of the pressure-sensitive adhesive on the tape was observed. The degree of the pressure-sensitive adhesive peeling was evaluated based on the below standard.

<Evaluation Standard>

A: no residue with a diameter of 1 mm or more was observed

B: residue with a diameter of 2 mm or more in 5 places or less

C: residue with a diameter of 2 mm or more in 6 places or more

2. Measurement of Gel Fraction 0.2 g of the pressure-sensitive adhesive was collected from the polarizing plate prepared in each of Examples and Comparative Examples, and was deposited in 100 g of the solvent (ethyl acetate). After 24 hours, an insoluble fraction (gel) was filtered out using a mesh with a size of 200 meshes and the amount of the obtained gel was substituted into the following Equation 1 to calculate the gel fraction. The evaluation standard based on the calculated gel fraction is as follows.

$$\text{Gel fraction (\%)} = 100 \times \text{the weight of the insoluble fractions filtered by a mesh (unit: g)}/0.2 \quad \text{[Equation 1]}$$

<Evaluation Standard>

A: gel fraction was 70% or more and less than 80%

B: gel fraction was 60% or more and less than 70%

C: gel fraction was less than 60%

3. Evaluation of Durability

The polarizing plates prepared in Examples and Comparative Examples were cut to a size of 180 mm×320 mm (width×length) to prepare specimens, and such obtained specimens were attached to 19-inch commercial panels. Thereafter, the panels with the polarizing plates were left in an autoclave (50° C., 5 atm) for about 20 minutes such to produce test samples. The test samples were left at 80° C. for 500 hours, during which the formation of bubbles and peeling was observed, and then the heat resistance durability was evaluated based on the following standard. Further, the test samples were left for 500 hours under conditions of 60° C. and a relative humidity of 90%, during which the formation of bubbles and peeling at the pressure-sensitive adhesive interface was observed, and then the water resistance durability was also evaluated based on the following standard.

<Evaluation Standard>

A: no bubbles, peeling or lifting was observed

B: bubbles, peeling and/or lifting were observed slightly

C: bubbles, peeling and/or lifting were observed substantially

4. Evaluation of Bending

The polarizing plates prepared in Examples and Comparative Examples were cut to a size of 180 mm×320 mm (width×length) and attached to glass substrates (0.7T) with a size of 200 mm×400 mm (width×length) to be matched to the center part of the glass substrates, and then were aged for 72 hours in a chamber at 60° C. Positions 1-8 of polarizing plates attached to a glass substrate are demonstrated by numerals 1-8 in FIG. 1. Subsequently, the glass substrates taken out of the chamber were left for 4 hours at room temperature. Thereafter, a center position 4 and a center position 5 of polarizing plates attached to a glass substrate shown in FIG. 1 were laid on a flat floor and the difference in the distances in which an end position 1 and an end position 8 of polarizing plates attached to a glass substrate shown in FIG. 1 rose from the flat floor was measured to evaluate the degree of bending based on the following standard.

<Evaluation Standard>

A: the difference between the distances in which the end position 1 and the end position 8 in FIG. 1 rose from the flat floor was less than 3 mm B: the difference between the distances in which the end position 1 and the end position 8 in FIG. 1 rose from the flat floor was 3 mm or more and less than 5 mm C: the difference between the distances in which the end position 1 and the end position 8 in FIG. 1 rose from the flat floor was 5 mm or more 5. Measurement of Acid Value The polymerization solutions prepared in each Preparation Example were fully dried to form the polymer samples, and 0.5 g of each of the obtained samples was dissolved in 50 g of a solvent of toluene and 2-propanol mixed at a weight ratio of 1:1. The proper amount of a phenolphthalein indicator which contains acrylic acid having a molecular weight of 72.06 was added into the resulting solution, and a prepared base solution (0.1 M, KOH) was further put dropwise into the transparent sample solution with stirring, until an equivalence point, at which the color of the sample solution turned red, was reached. Thereafter, when the base solution was put dropwise into the sample solution so that an equivalence point was almost reached, the sample solutions were observed for color changes for about 10 seconds, and then the volume of the base solution which was added dropwise just prior to the change of the color was measured. The acid value was calculated by substituting such measured volume into the following Equation.

$$A=(X \times Y \times 72.06)/M \quad \text{[Equation]}$$

A: an acid value (mgKOH/g)
X: a mol concentration of KOH (M)
Y: a volume of the base solution put dropwise into the samples (ml)
M: a weight of the polymer samples (=0.5 g)

6. Measurement of Storage Modulus

A storage modulus of the pressure-sensitive adhesives prepared in Examples and Comparative Examples were measured using Advanced Rheometric Expansion System (ARES; manufactured by TA Instruments). Specifically, the cross-linked pressure-sensitive adhesives were cut to a diameter of 8 mm and a thickness of 1 mm to produce the samples. The frequency sweep was carried out for the obtained samples using a parallel plate fixture, under conditions of 10% strain and a frequency of 0.1 Hz to 500 Hz, and a storage modulus of the pressure-sensitive adhesive composition in the Examples and the Comparative Examples was measured under conditions of 30° C. and 1 rad/s.

7. Measurement of Glass Transition Temperature 5 mg of the sample of the polymerization solution prepared in each of Preparation Examples was measured with the glass transition temperatures within the range of −70° C. to 50° C., using a Differential Scanning calorimetry (DSC; manufactured by TA Instruments) with a heating rate of 10° C. per minute.

Preparation Example 1. Preparation of Polymerization Solution A1

A monomer mixture composed of n-butyl acrylate (BA) forming a homopolymer with a glass transition temperature of −45° C., tert-butyl acrylate (t-BA) forming a homopolymer with a glass transition temperature of 118° C., and 4-hydroxybutyl acrylate (HBA) forming a homopolymer with a glass transition temperature of −80° C. at the weight ratio of 79:20:1 and ethyl acetate as a solvent were put into a reactor equipped with a cooling device for the regulation of temperature and the reflux of nitrogen gas. Subsequently, the reactor was purged with nitrogen gas for 1 hour in order to remove oxygen from the reactor and the proper amount of azobisisobutylonitrile (AIBN) was added therein as a reaction initiator for polymerization. After polymerization, the reactants were diluted with ethyl acetate (EAc) and thereby a polymerization solution A1 with a weight average molecular weight of about 1,800,000 and with a distribution of molecular weight of about 3.8 was obtained.

Preparation Examples 2 to 4. Preparation of Polymerization Solutions A2, B1 and B2

The polymerization solutions A2, B1, and B2 were prepared in the same manner as in Preparation Example 1 except that the type and ratio of the monomers were adjusted as shown in Table 1 below.

TABLE 1

|  |  | BA | t-BA | HBA | MA | AA |
|---|---|---|---|---|---|---|
| Polymerization solution | A1 | 79 | 20 | 1 | — | — |
|  | A2 | 79 | — | 1 | 20 | — |
|  | B1 | 99 | — | 1 | — | — |
|  | B2 | 96 | — | — | — | 4 |

Content unit: parts by weight
BA: butyl acrylate (glass transition temperature (Tg) of homopolymer: about −45° C.)
t-BA: tert-butyl acrylate (Tg of homopolymer: about 43° C. to 107° C.)
HBA: 4-hydroxybutyl acrylate (Tg of homopolymer: about −32° C.)
MA: methyl acrylate (Tg of homopolymer: about 10° C.)
AA: acrylic acid (Tg of homopolymer: about 105° C.)

Example 1

Preparation of Coating Solution (Pressure-Sensitive Adhesive Composition)

0.1 parts by weight of a cross-linking agent (T-39M; manufactured by Soken Chemical & Engineering Co., Ltd.) based on 100 parts by weight of the solid fractions of the polymerization solution A1 prepared in Preparation Example 1, and 8 ppm of a catalyst (DBTDL, dibutyltin dilaurate) were mixed in a solvent (EAc, ethyl acetate) and thereby a coating solution (pressure-sensitive adhesive composition) was prepared.

Preparation of Pressure-Sensitive Adhesive Polarizing Plate

The prepared coating solution was laid on a release-processed surface of the release polyethylene terephthalate (PET) film with a thickness of 38 μm (MRF-38, manufactured by Mitsubishi Chemical Corporation) and was stored for about 3 minutes at 120° C. so as to form a coating layer having a thickness of about 23 μm after drying. After drying, the pressure-sensitive adhesive layer formed on the release film was laminated on a wide view (WV) liquid crystal layer of a polarizing plate (laminated structure: TAC/PVA/TAC, TAC=triacetyl cellulose, PVA=polyvinyl alcohol-based polarizer film), one side of which was coated with the WV liquid crystal layer. Thereby, the pressure-sensitive adhesive polarizing plate sequentially including a polarizing plate, a pressure-sensitive adhesive layer, and a release PET film was prepared.

Examples 2 to 3 and Comparative Examples 1 to 5

The pressure-sensitive adhesive composition (coating solution) and the adhesive polarizing plate were prepared in the same manner as in Example 1, except that the composition and ratio of each pressure-sensitive adhesive composition (coating solution) were adjusted as shown in Table 2 below when prepared.

TABLE 2

|  |  | Example | | | Comparative Example | | | | |
|---|---|---|---|---|---|---|---|---|---|
|  |  | 1 | 2 | 3 | 1 | 2 | 3 | 4 | 5 |
| Polymerization solution | Type | A1 | A1 | A2 | A1 | A1 | B1 | B2 | A1 |
|  | Content | 100 | 100 | 100 | 100 | 100 | 100 | 100 | 100 |
| Cross-linking agent | Type | (1) | (1) | (1) | (1) | (1) | (1) | (1)/(2) | (1) |
|  | Content | 0.1 | 0.1 | 0.1 | 0.1 | 0.1 | 0.1 | 1.36/0.01 | 0.2 |
| DBTDL content |  | 8 | 10 | 8 | 50 | — | 50 | — | 50 |

Content unit: parts by weight (polymerization solution is measured with its solid fraction/content unit of DBTDL: ppm)
Cross-linking agent (1): T-39M, Soken Chemical & Engineering Co., Ltd.
Cross-linking agent (2): T-743, Soken Chemical & Engineering Co., Ltd.
DBTDL: dibutyltin dilaurate The property evaluation results in accordance with each of the Examples and the Comparative Examples are shown in Table 3.

TABLE 3

|  | Example | | | Comparative Example | | | | |
|---|---|---|---|---|---|---|---|---|
|  | 1 | 2 | 3 | 1 | 2 | 3 | 4 | 5 |
| Pressure-sensitive adhesive peeling | A | A | A | C | A | B | C | A |
| Gel fraction | A | A | A | A | C | A | A | A |
| Durability | A | A | A | A | C | B | A | A |
| Bending evaluation | A | A | A | A | A | A | B | C |
| Acid value (mgKOH/g) | 0.12 | 0.12 | 0.15 | 0.13 | 0.12 | 0.16 | 11 | 0.13 |
| Storage modulus (MPa) | 0.053 | 0.053 | 0.051 | 0.053 | 0.052 | 0.043 | 0.078 | 0.055 |

As described above, the comparison results of Examples and Comparative Examples show that the pressure-sensitive adhesive composition in accordance with an exemplary embodiment of the present invention offers a pressure-sensitive adhesive that has increased durability and processability in manufacturing by increasing a hardness, even when the pressure-sensitive adhesive layer is formed to be thinner than a typical pressure-sensitive adhesive composition, and that can prevent a pressure mark and peeling of the pressure-sensitive adhesive, as well as a bending problem generated when applied on an optical member such as a polarizing plate, etc.

What is claimed is:

1. A pressure-sensitive adhesive composition, consisting of:
   a pressure-sensitive adhesive polymer including a polymerization unit of a first monomer which forms a homopolymer having a glass transition temperature of less than 0° C., a polymerization unit of a second monomer which forms a homopolymer having a glass transition temperature of 0° C. or more, and a polymerization unit of a cross-linking monomer, and having an acid value of 1 mgKOH/g or less;
   a cross-linking agent at 0.01 to 10 parts by weight, relative to 100 parts by weight of the pressure-sensitive adhesive polymer;
   a cross-linking catalyst in an amount of 1 to 40 ppm;
   optionally at least one of other monomers for copolymerization;
   optionally a silane coupling agent;
   optionally a tackifier; and
   optionally one or more additives selected from the group consisting of a curing agent, a UV light stabilizer, an antioxidant, a coloring agent, a reinforcing agent, a filler, an antifoaming agent, a surfactant and a plasticizer, wherein the pressure sensitive adhesive composition has a storage elastic modulus at 30° C. and 1 rad/sec ranging from 0.01 MPa to 0.5 MPa in a state in which a cross-linked structure is formed.

2. The pressure-sensitive adhesive composition of claim 1, wherein the homopolymer formed of the first monomer has a glass transition temperature ranging from −100° C. to −20° C.

3. The pressure-sensitive adhesive composition of claim 1, wherein the homopolymer formed of the second monomer has a glass transition temperature ranging from 5° C. to 200° C.

4. The pressure-sensitive adhesive composition of claim 1, wherein the second monomer is an acyclic monomer.

5. The pressure-sensitive adhesive composition of claim 1, wherein the pressure-sensitive adhesive composition has a glass transition temperature ranging from −50° C. to 50° C. in a state in which a cross-linked structure is formed.

6. The pressure-sensitive adhesive composition of claim 1, wherein the cross-linking catalyst is at least one selected from the group consisting of trialkylaminoalkylethanol amine, N,N,N',N'-tetraalkylhexanediamine, trialkylamine, imidazole, naphthenic acid cobalt, dialkyltin diacetate, dialkyltin diacetylacetonate, trialkyltin hydroxide, dialkyltin dilaurate, and a combination thereof.

7. A pressure-sensitive adhesive optical laminate comprising:

an optical film; and a pressure-sensitive adhesive layer formed on either or both sides of the optical film, and containing the pressure-sensitive adhesive composition of claim 1 which is cross-linked.

8. A pressure-sensitive adhesive polarizing plate comprising:

a polarizer film; and a pressure-sensitive adhesive layer formed on either or both sides of the polarizer film, and containing the pressure-sensitive adhesive composition of claim 1 which is cross-linked.

9. A display device comprising the optical laminate of claim 7.

10. A display device comprising the polarizing plate of claim 8.

11. The pressure-sensitive adhesive composition of claim 1, wherein the silane coupling agent is a compound of Formula 1 or Formula 2:

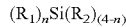  [Formula 1]

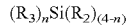  [Formula 2]

wherein $R_1$ is a beta-cyanoacetyl group or a beta-cyanoacetylalkyl group, $R_3$ is an acetoacetyl group or an acetoacetylalkyl group, $R_2$ is an alkoxy group and n is an integer of 1 to 3.

12. The pressure-sensitive adhesive composition of claim 1, wherein the silane coupling agent is acetoacetylpropyl trimethoxysilane, acetoacetylpropyl triethoxysilane, beta-cyanoacetylpropyl trimethoxysilane, or beta-cyanoacetylpropyl triethoxysilane.

13. The pressure-sensitive adhesive composition of claim 1, wherein the tackifier is selected from the group consisting of hydrocarbon resins, hydrogenated hydrocarbon resins, rosin resins, hydrogenated rosin resins, rosin ester resins, hydrogenated rosin ester resins, terpene resins, hydrogenated terpene resins, terpene phenol resins, hydrogenated terpene phenol resins, polymerized rosin resins, polymerized rosin ester resins, and a combination thereof.

14. The pressure-sensitive adhesive composition of claim 1, wherein the at least one of other monomers is selected from the group consisting of a styrene-based monomer and a monomer containing a glycidyl group.

15. The pressure-sensitive adhesive composition of claim 13, wherein the styrene-based monomer is methyl styrene.

16. The pressure-sensitive adhesive composition of claim 14, wherein the monomer containing a glycidyl group is glycidyl (meth)arylate.

17. The pressure-sensitive adhesive composition of claim 1, wherein the pressure-sensitive adhesive composition has a gel fraction of 70 wt % to 80 wt % calculated using the following Equation 1 after forming a cross-linked structure:

Gel fraction (%)=$B/A$×100  [Equation 1]

wherein in Equation 1, A is a mass of the pressure-sensitive adhesive composition forming a cross-linked structure, B is a dry mass of the insoluble fraction which is obtained by depositing the pressure-sensitive adhesive composition having a mass of A in ethyl acetate for 24 hours, in the state in which the pressure-sensitive adhesive composition is laid in the mesh having a size of 200 meshes at room temperature.

* * * * *